July 15, 1941.　　　　G. LESSMAN　　　　2,249,216
AUTOMATIC PHONOGRAPH
Filed Dec. 23, 1937　　　　13 Sheets-Sheet 1

Inventor:
Gerhard Lessman
By
Williams, Bradbury, McCaleb & Hinkle
Attys.

July 15, 1941.  G. LESSMAN  2,249,216
AUTOMATIC PHONOGRAPH
Filed Dec. 23, 1937    13 Sheets-Sheet 2
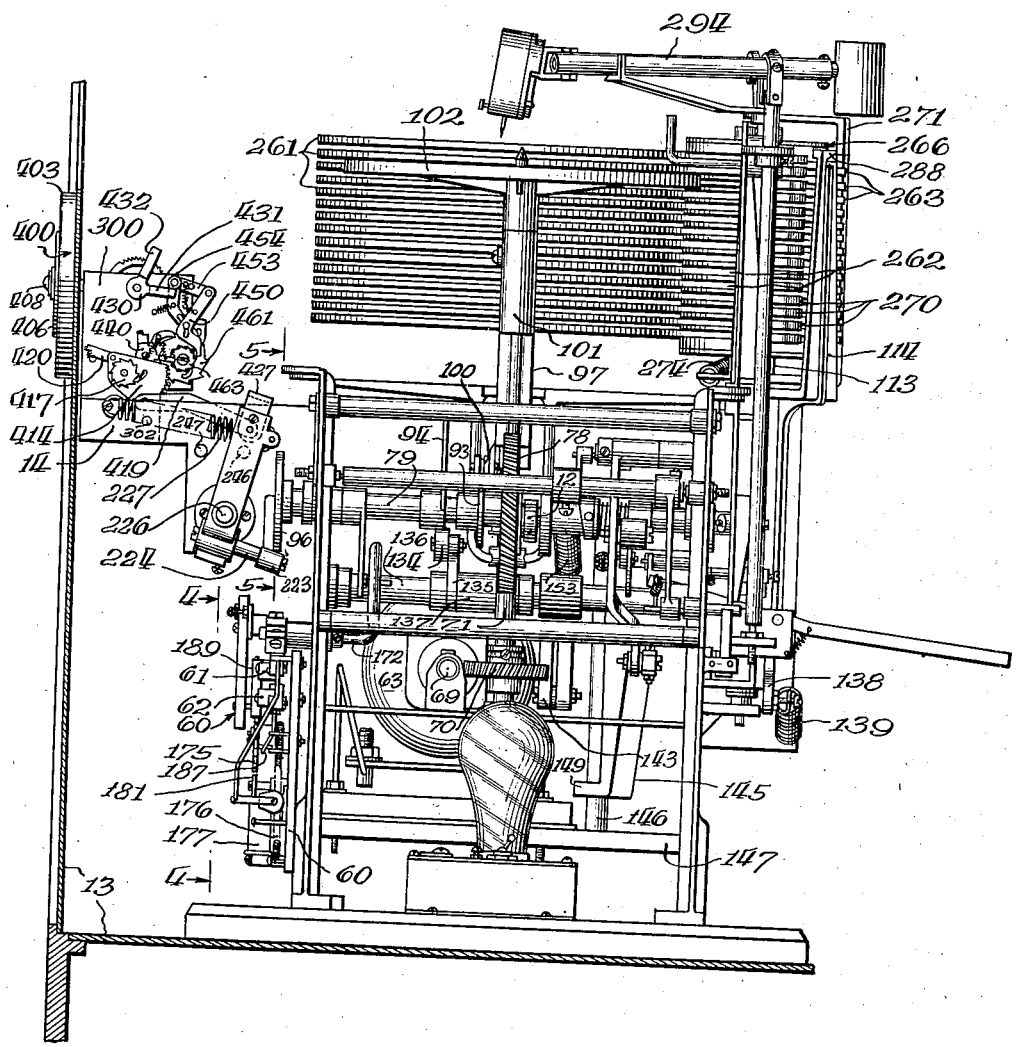

July 15, 1941. G. LESSMAN 2,249,216
AUTOMATIC PHONOGRAPH
Filed Dec. 23, 1937 13 Sheets-Sheet 3
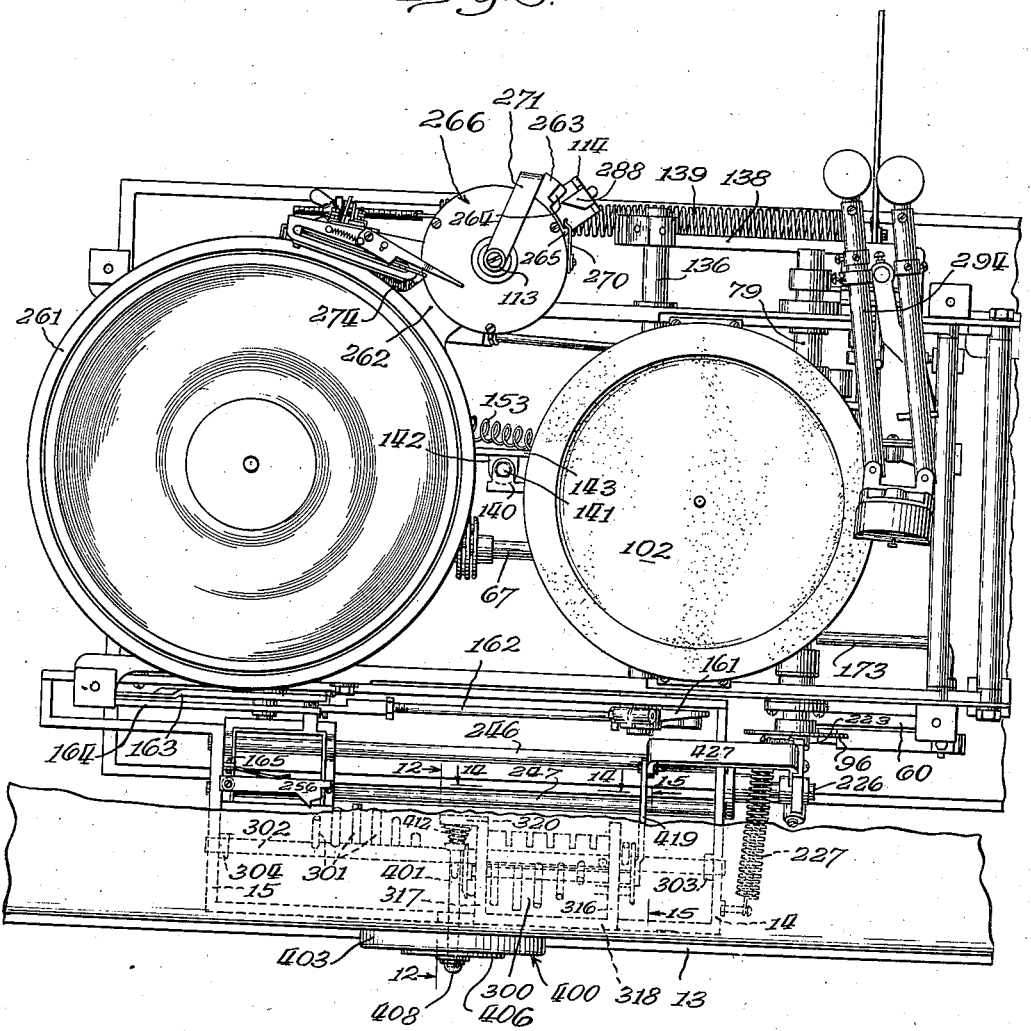

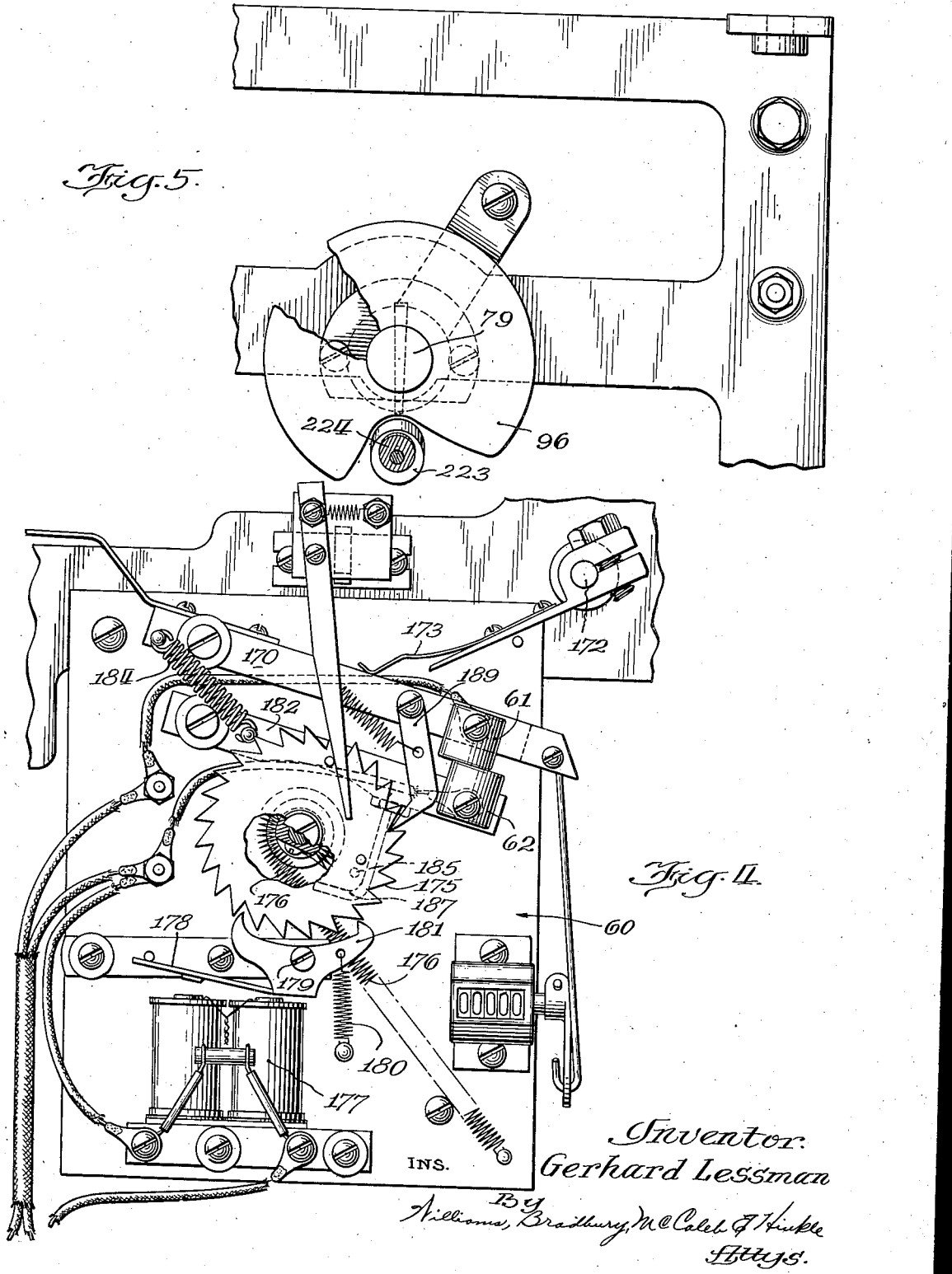

July 15, 1941.     G. LESSMAN     2,249,216
AUTOMATIC PHONOGRAPH
Filed Dec. 23, 1937     13 Sheets-Sheet 5

Inventor:
Gerhard Lessman
By
Williams, Bradbury, McCaleb & Hinkle
Attys.

July 15, 1941.　　　　　G. LESSMAN　　　　　2,249,216
AUTOMATIC PHONOGRAPH
Filed Dec. 23, 1937　　　　13 Sheets-Sheet 6

Inventor:
Gerhard Lessman
By
Williams, Bradbury, McCaleb & Hinkle
Attys.

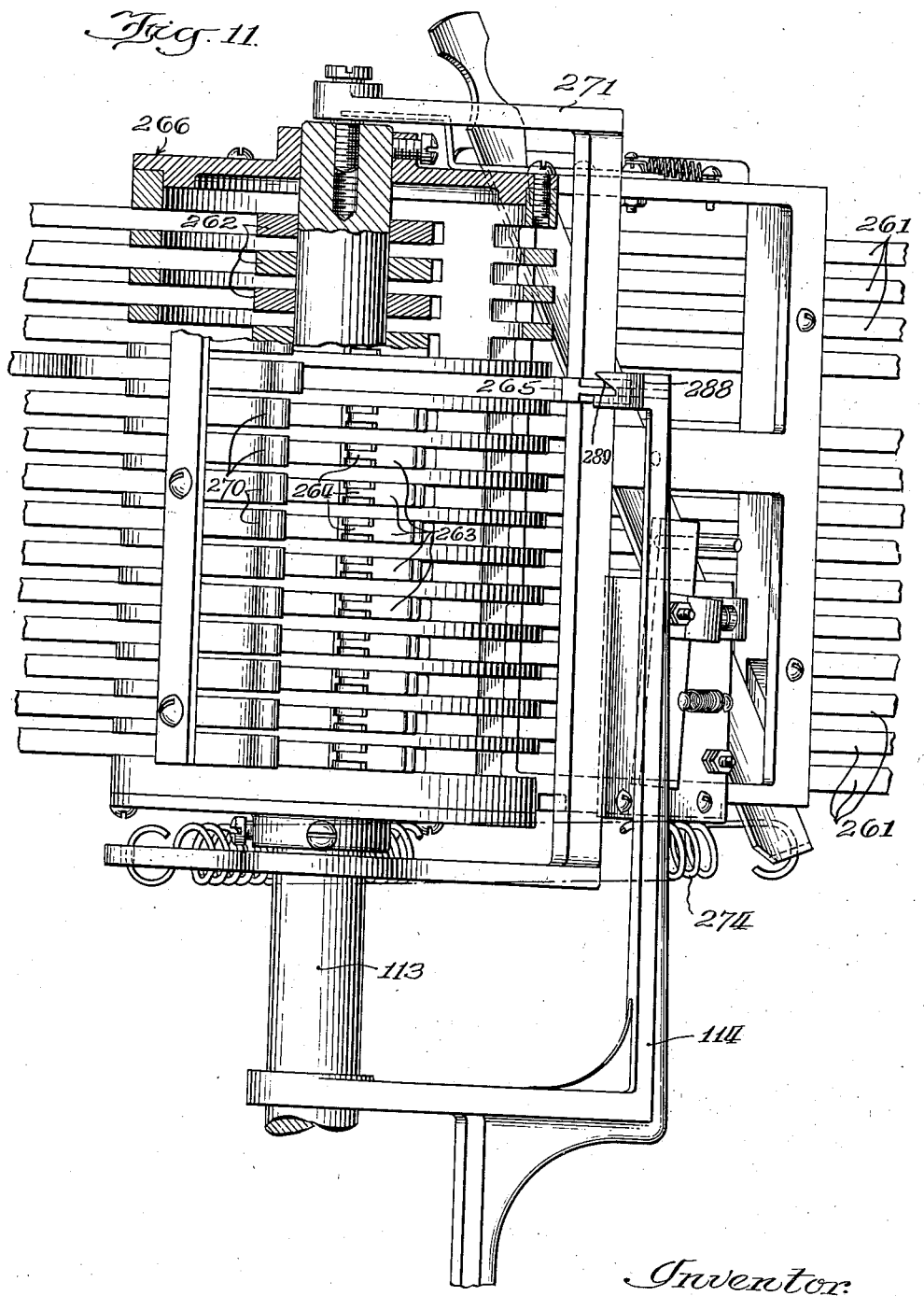

July 15, 1941.  G. LESSMAN  2,249,216
AUTOMATIC PHONOGRAPH
Filed Dec. 23, 1937  13 Sheets-Sheet 8

Inventor.
Gerhard Lessman
By Williams, Bradbury,
McCaleb & Hinkle Attys

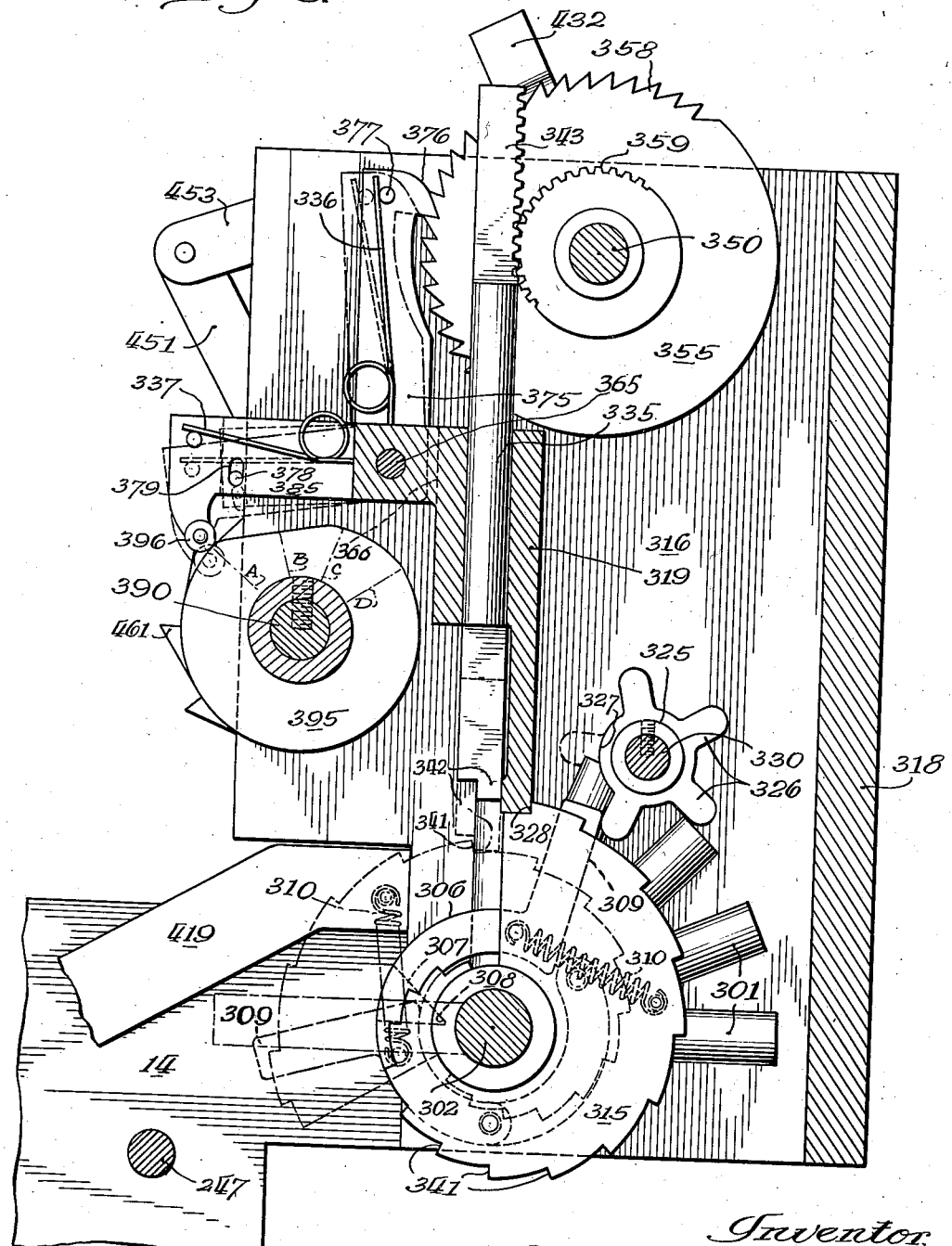

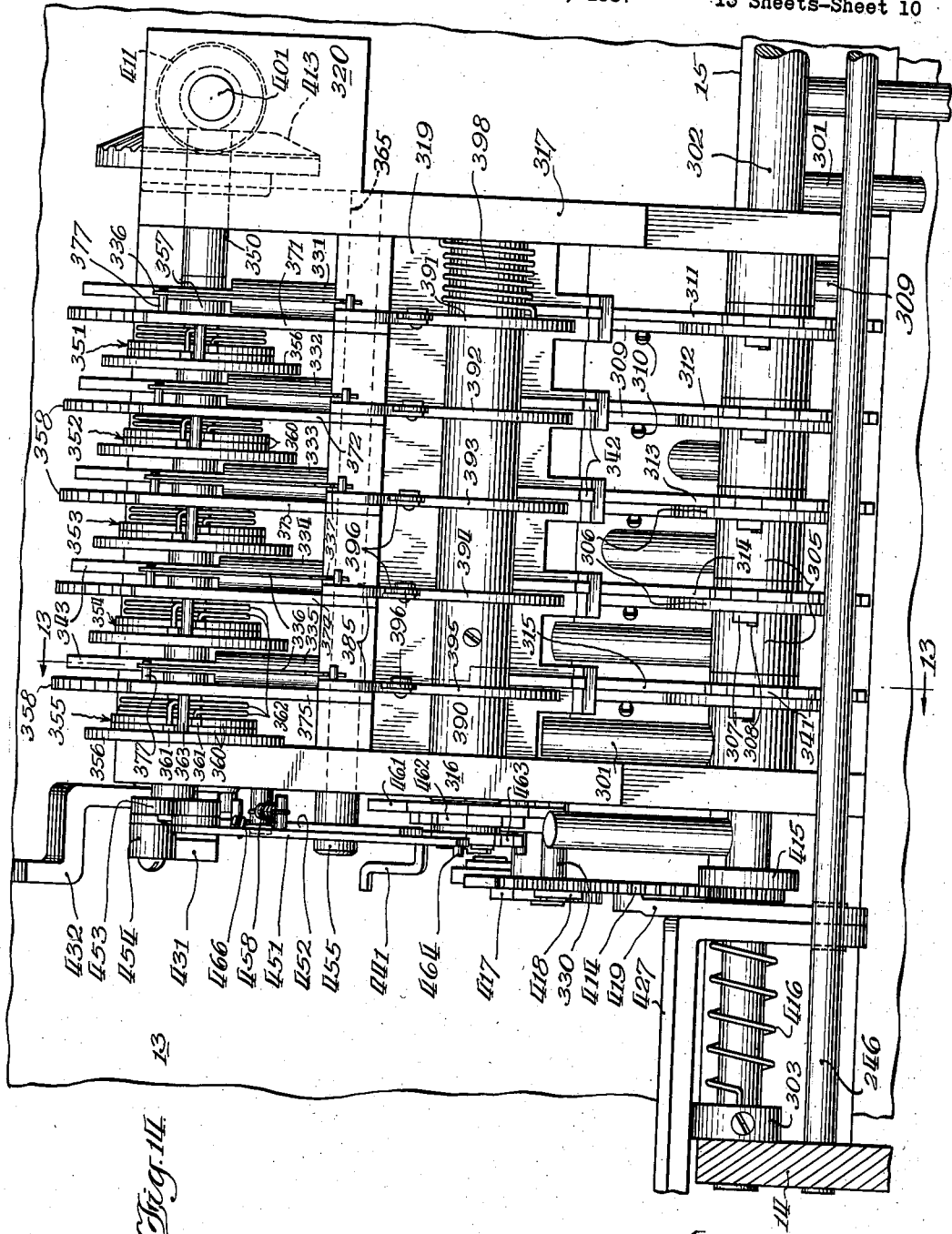

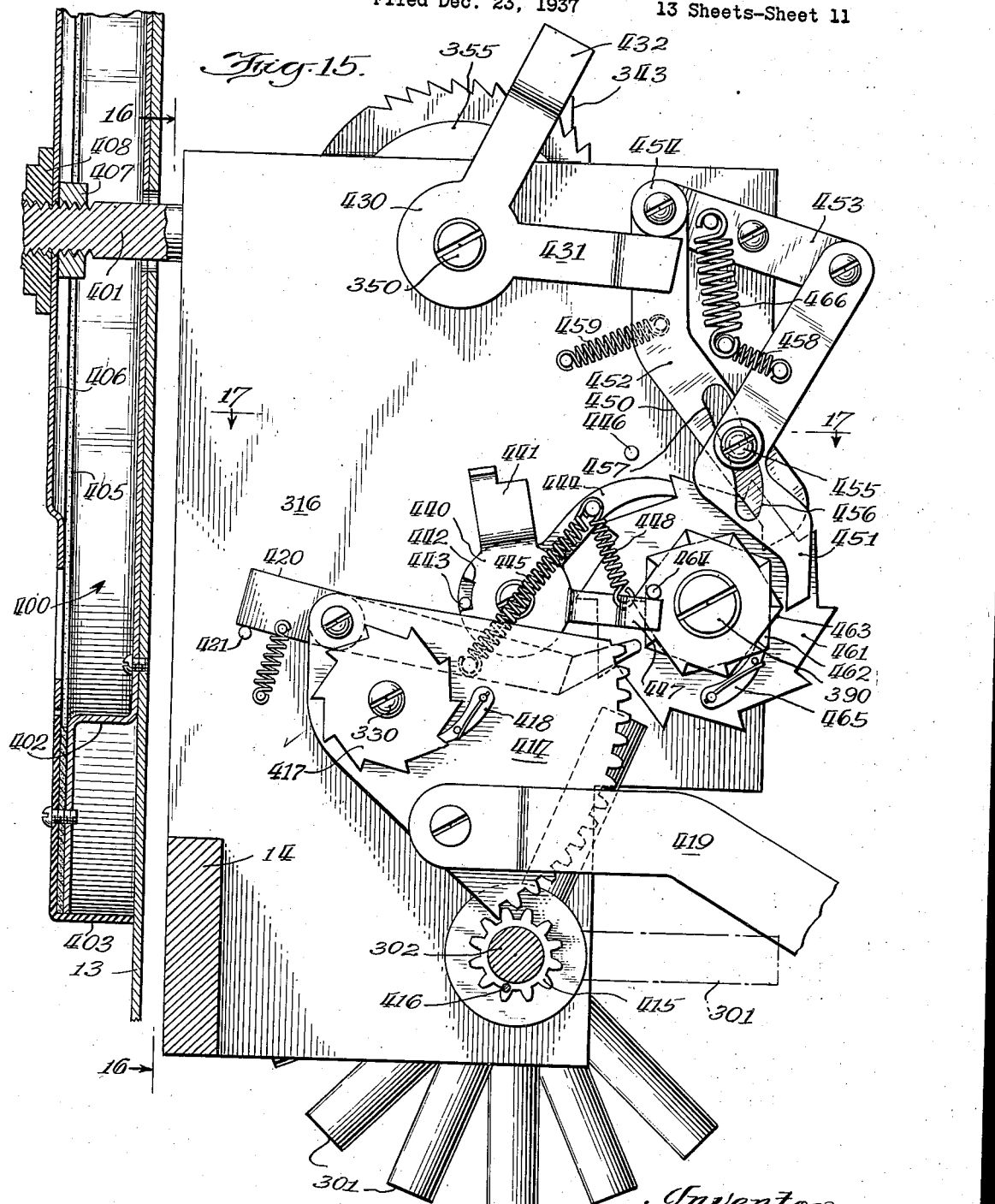

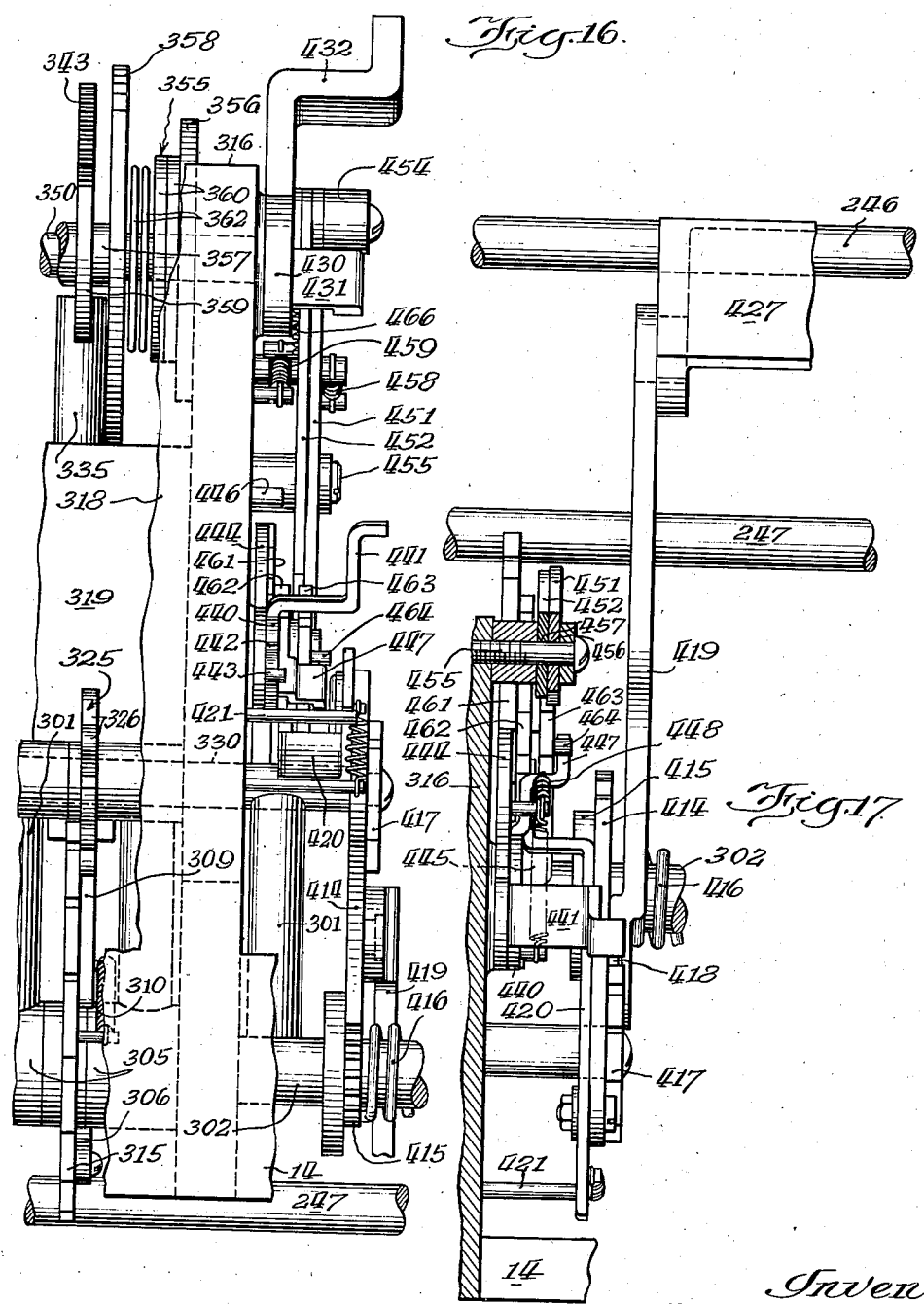

July 15, 1941.  G. LESSMAN  2,249,216
AUTOMATIC PHONOGRAPH
Filed Dec. 23, 1937   13 Sheets-Sheet 13

Inventor
Gerhard Lessman
By
Williams, Bradbury, McCoah & Hinkle
Attys.

Patented July 15, 1941

2,249,216

UNITED STATES PATENT OFFICE 2,249,216

AUTOMATIC PHONOGRAPH

Gerhard Lessman, Chicago, Ill., assignor to J. P. Seeburg Corporation, Chicago, Ill., a corporation of Illinois Application December 23, 1937, Serial No. 181,258

7 Claims. (Cl. 274—10)

This invention relates to automatic phonographs which are adapted to play a sequence of records, and its principal object is to provide an improved phonograph of this type.

The present phonograph is particularly intended for employment as a coin-operated phonograph, capable of playing a number of records, according to the number of coins inserted, in the same sequence as their order of preselection.

One of the objects of the invention is to provide a phonograph having a multi-selector capable of preselecting a sequence of records to be played in the order of their selection.

A further object of the invention is to provide a phonograph having a multi-selector capable of preselecting a program of records which can include repeated renditions of any one record.

A further object of the invention is to provide a phonograph having a multi-selector capable of clearing itself after a full sequence of records has been performed preparatory to preselecting a further sequence of renditions.

A further object of the invention is to provide a phonograph having a multi-selector capable of being manually cleared of previous selections, should the operator so desire.

A further object of the invention is to provide a phonograph having a multi-selector capable of functioning to attain the objects previously disclosed, while the phonograph is in operation.

A further object of the invention is to provide a phonograph having a multi-selector capable of dial operation.

Further objects of the invention will present themselves during the following description of a specific embodiment of the invention, taken in conjunction with the accompanying drawings, in which:

Fig. 2 is an end elevation looking from the right-hand side;

Fig. 3 is a plan view thereof;

Fig. 4 is a front view of the accumulator switch along the line 4—4 of Fig. 2, showing the elements in the position in which they are located during normal operation;

Fig. 5 is a fragmentary elevation, taken along the line 5—5 of Fig. 2, showing the forward end of the main cam shaft and a cam carried thereby;

Fig. 11 is a partially sectioned view of the means for carrying the record holders;

Fig. 13 is a section through the selector mechanism, taken along the plane 13—13 of Fig. 14;

Fig. 14 is a rear view of the selector mechanism looking along the lines 14—14 of Fig. 3;

Fig. 15 is an end view of the selector looking along the lines 15—15 of Fig. 3;

Fig. 16 is a fragmentary elevation of the selector mechanism looking along lines 16—16 of Fig. 15;

Fig. 17 is a fragmentary plan section, taken along lines 17—17 of Fig. 15;

Figure 1:
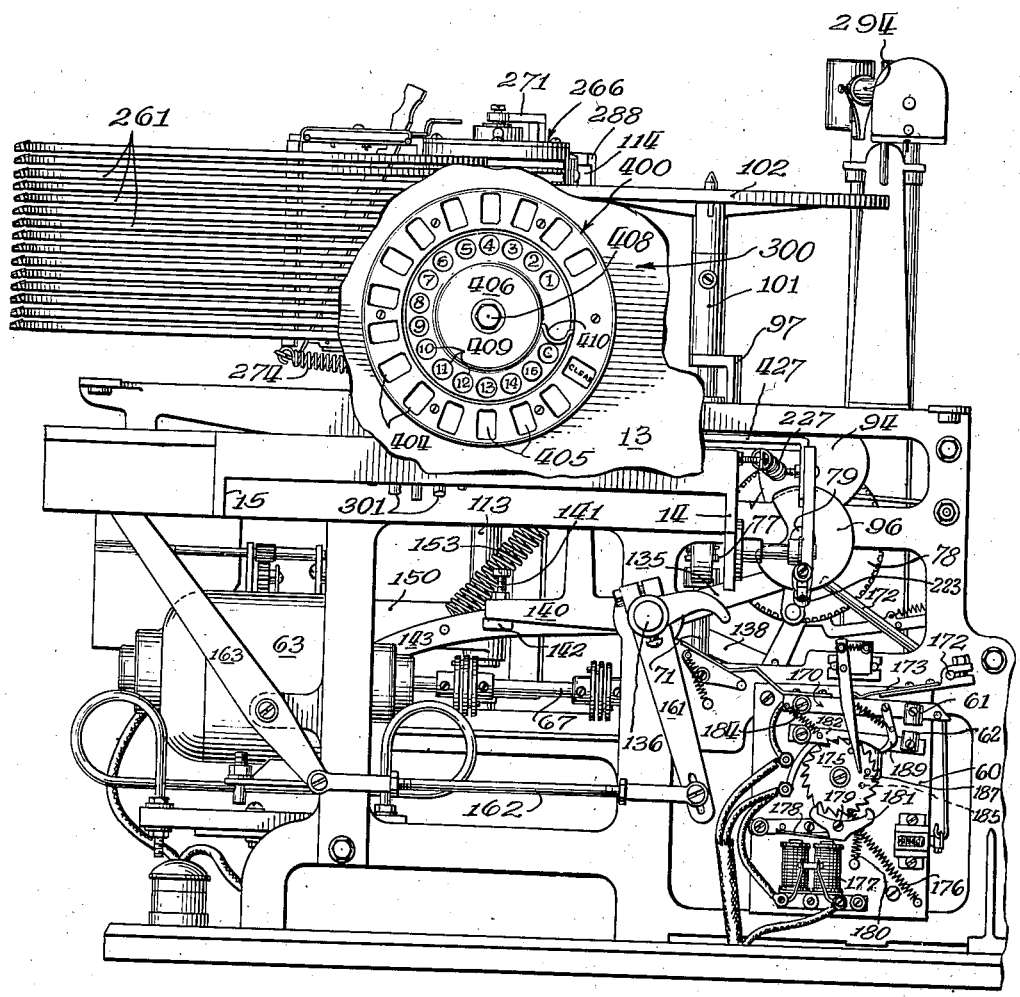
Fig. 1 is a front elevation of the improved phonograph, the cabinet normally enclosing the same, and the electrical amplifying and sound producing system being omitted.

Referring to the drawings in which like numerals designate like parts throughout the same, the present invention is described in connection with the automatic phonograph described and claimed in the pending application Serial No. 160,235, filed by Russell I. Wilcox.

Referring now to the drawings, the phonograph, illustrated may suitably be enclosed within a cabinet 13, fragmentary portions of which are shown. The instrument is arranged for control by means of coins inserted in the usual manner. This control may be effected by means of an accumulator switch 60, which controls the supply of energy to the motor 63.

The accumulator switch 60 comprises a ratchet wheel 175 which is urged to rotate in a counter-clockwise direction by means of a spring 176. When one or more coins are inserted by the coin chute (not shown) the electromagnet 177 is energized an appropriate number of times. Each time the magnet 177 is energized, the armature 178 pivotally mounted at 179 is attracted against the tension of spring 180. Said armature carries an escapement 181, which causes ratchet 175 to rotate one tooth each time the armature is attracted and released.

Two contacts 61 and 62, urged together by spring 184, which control the supply of energy to the motor 63, are mounted on the ends of pivoted insulating blocks 170 and 182. Block 170 carries a pawl 189. Ratchet 175 is actuated when block 170 is forced downward by the action of lever 173 turned by shaft 172. After ratchet 175 has been electromagnetically actuated several times by the insertion of coins, the phonograph having started to play, will return the ratchet wheel 175 one tooth at a time, as each record plays, by the action of pawl 189, until the ratchet is returned to its initial position. On the last return engagement of pawl 189, a pin 185 rotating on ratchet 175 pulls apart the contacts 61 and 62 by carrying along with it the hook 187 set in block 182, thus effectively deenergizing the motor 63.

The motor 63, through shaft 67, turns a worm 69 which cooperates with a worm gear 70 keyed to vertical spindle 71. Said spindle carries on its upper extremity the elongated sleeve 101 of turntable 102. The spindle 71 is provided with a longitudinal slot into which projects a set screw carried by sleeve 101. Consequently, the turntable is capable of free vertical movement on the spindle, but is caused to rotate therewith. The lower end of the sleeve 101 rests on the carriage 97. A cam 93, carried by the main cam shaft 79, strikes a roller 100 carried by the carriage 97, thereby elevating the turntable 102 at appropriate times.

The spindle 71 is provided with a worm 77 which continuously operates a gear 78, free to rotate on the main cam shaft 79. Said gear is adapted to be clutched to shaft 79 by means of a clutch member 12 which is engaged at all times except when the tone arm 294 is reproducing a record on the turntable 102.

The main cam shaft 79 bears at its near end a cam 96 of such shape that its follower, roller 223, actuates the crank 427, on an arm 224 of which it is mounted, once very quickly just as the carriage 165 is being returned to its initial position. The crank 427, oscillating under the influence of cam 96, actuates the multi-selector 300 through the agency of link 419, as will be described later.

Figure 6:
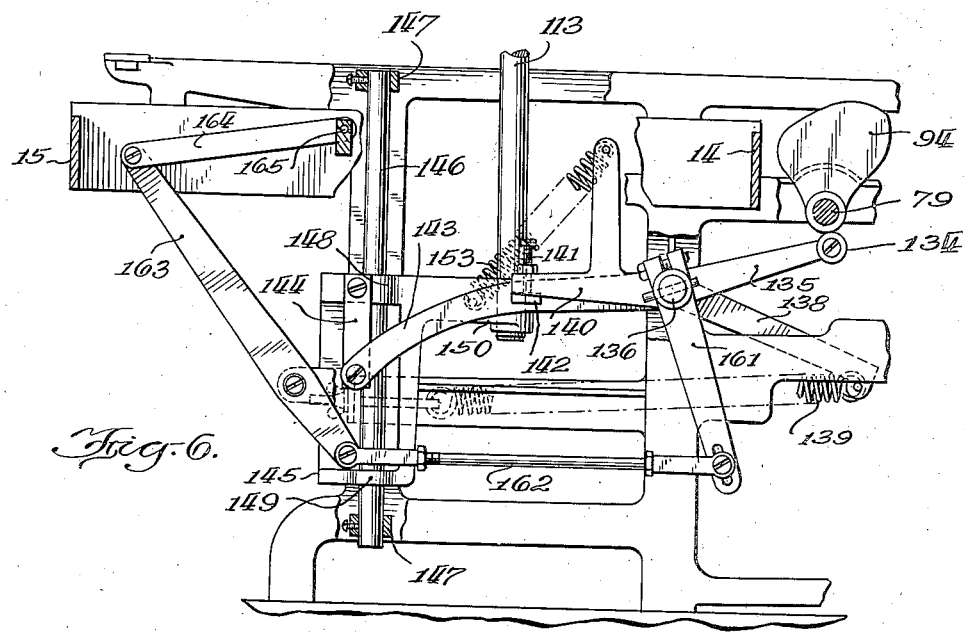
Fig. 6 is a frangmentary section viewed from the front of the machine, with numerous parts broken away and omitted in order to show the mechanism whereby the records are elevated and the selector carriage is actuated.
Figure 7:
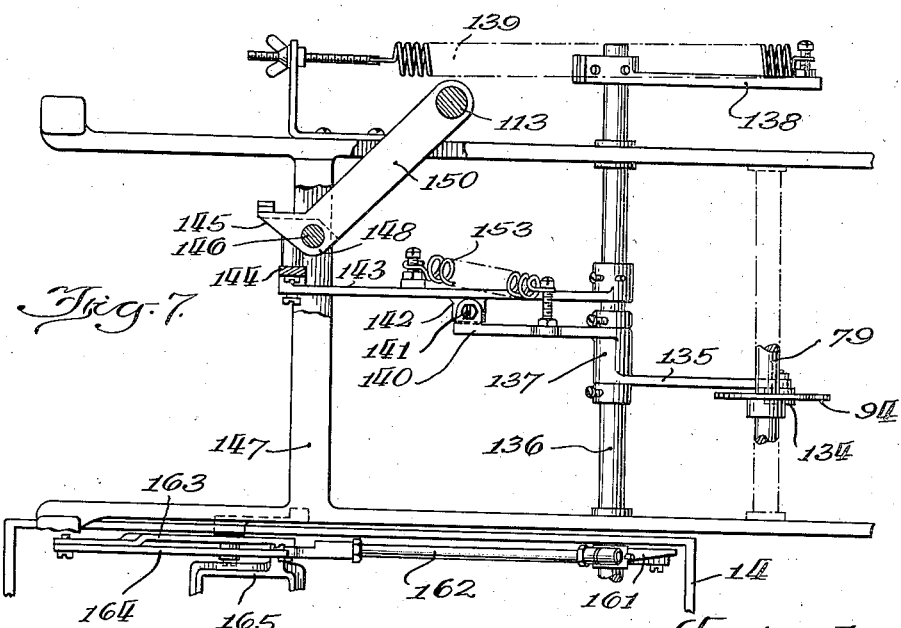
Fig. 7 is a plan view corresponding thereto.
Figure 8:
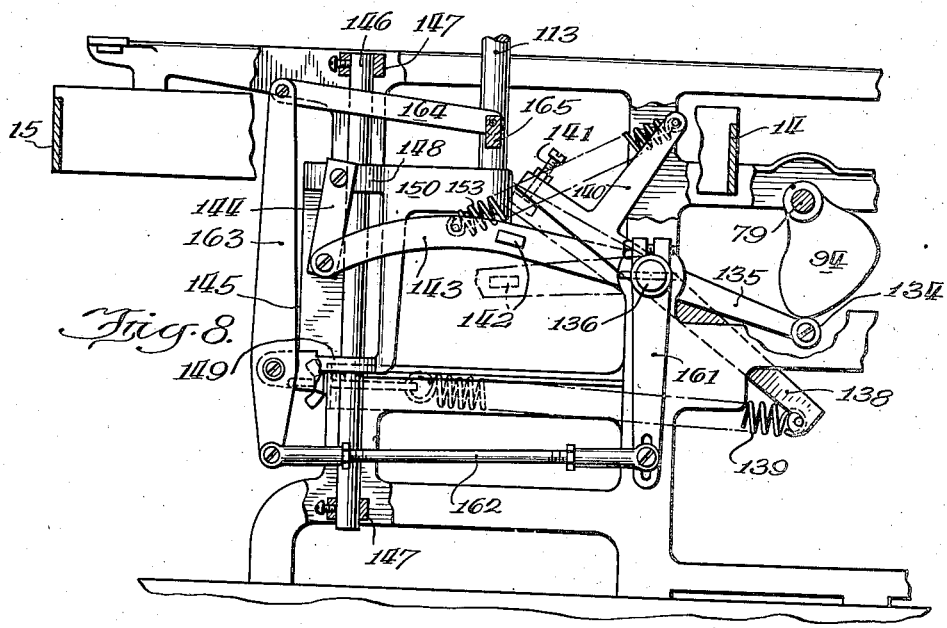
Fig. 8 is a view similar to Fig. 6 showing the elements in a different position, being the position in which the selector carriage is arrested to enable the machine to play the eighth record.
Figure 10:
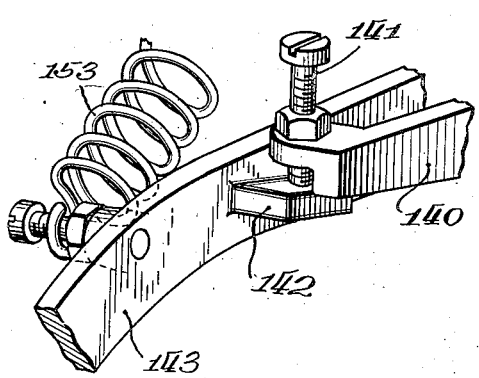
Fig. 10 is a perspective detail of elements shown in Figs. 6, 7, 8 and 9.
Figure 9:
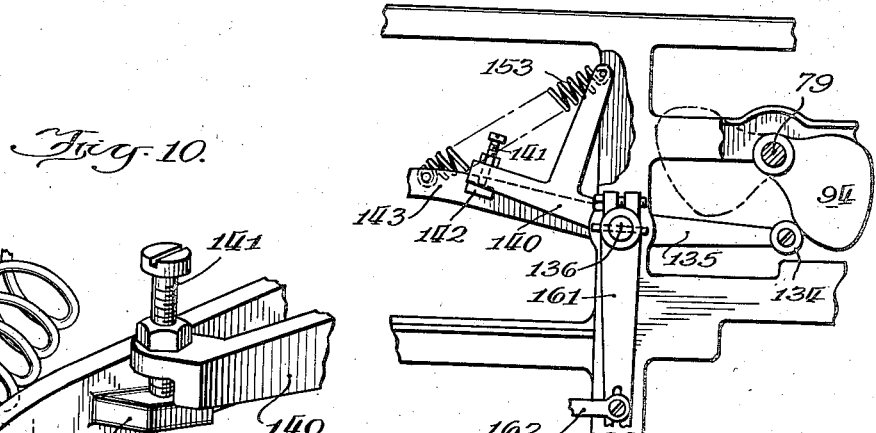
Fig. 9 is a fragmentary view similar to Figs. 7 and 8, showing the parts in different relationship.

The main cam shaft 79 bears a cam 94 cooperating with roller 134 borne on an arm 135 pivotally mounted on shaft 136 by means of a sleeve 137. The shaft is pivotally mounted on the chassis of the phonograph, and has rigidly mounted at its rear end an arm 138. This arm is biased towards the left, as viewed in Fig. 6, by means of a spring 139 for the purpose of counterbalancing to some extent the weight of the records, which are elevated by the mechanism now being described.

The sleeve 137 is provided with an integral arm 140 which carries at one end a set screw 141. This set screw is adapted to engage, in the nonplaying position of the machine, a lug 142 carried on an arm 143 rigidly mounted on the shaft 136 and which extends to the left of the machine. The left-hand end of the arm 143 is connected by means of a link 144 to a carriage 145 which is slidably mounted upon a vertical rod 146 which is rigidly supported by cross members 147 carried by the chassis.

The carriage comprises upper and lower flanges 148 and 149 which are provided with openings through which the rod 146 extends. The carriage 145 also comprises a rearwardly projecting arm 159 which rigidly carries the vertical rod 113. As will be described later, the vertical rod 113 supports the stack of records to be played.

Because of the resilient connection between arms 140 and 143 yielded by spring 153, as shown in Figs. 6, 7, 8, 9 and 10, the arm 143 tends to follow the arm 140. This movement of the arm 143 is accompanied by an upward movement of the carriage 145. Means are provided, as will be described hereinafter, for arresting the carriage at various positions. When the carriage is thus arrested, the spring 153 extends, this relation being shown in Fig. 8.

The carriage 145 carries the records which are to be played. These records are mounted in individual ring carriers 261. These carriers are individually supported by means of a cage structure 266, best seen in Fig. 11, which is rigidly mounted on the bar 113. Each ring carrier has a radial extension 262 provided with an opening through which extends the vertical rod 113 of carriage 145. Each radial extension 262 is provided at its extremity with an integral tab 263 which is reduced in thickness at that edge 264 normally toward the turntable position. Each extension 262 is also provided with a small lug 265. The tabs 263 and lugs 265 project out of the cage structure at the side opposite the record carrier with which they are associated. The cage structure 266 carries spring members 270 which are adapted to engage the lugs 265 when the carirers are in the inoperative position.

A bail 271 is pivotally mounted for rotation on the axis of the bar 113. Said bail turns against the tension of spring 274. The bail 271 is normally engaged by all the tabs 263. When one of the carriers 261 is moved towards the turntable position, its tab catches the bail 271 and carries it into position against the opposition of spring 274, thus accumulating tension therein for restoring said carrier to the normal position.

An arm 114 upwardly projecting from the carriage 145 bears at its upper end a block 288 provided with a generally triangular opening 289 on its side directed towards the tabs 263. The block 288 extends inwardly of the arm 114, so that the arm may clear the tabs 264 while the blocks 288 may engage a selected one of them. The arrestment of the carriage 145 is so arranged that the tab 264 of that record intended to be played is located on exactly the same level as the block 288.

Referring again to Fig. 6, an arm 161 keyed to shaft 136, and therefore positively connected with the record carriage elevating arm 143, actuates the link 162. This link is connected through an intermediately pivoted crank with a link 164, actuating the carriage 165. During the rotation of cam 94, carriage 165 is at first normally forced to travel to the right, guided by rods 246 and 247 until restrained by one of the spokes 301 of the multi-selector mechanism 300, in the manner to be described subsequently. In so doing, the carriage 165 causes carriage 145 to be also arrested, because of the positive interconnection already described. At the end of the normal cycle of the machine, the carriage 165 moves into its extreme left-hand position, carrying the carriage 145 to its lowermost position at the same time.

The carriage 165 bears a dog 256 adapted to abut against that one of spokes 301 which extends rearwardly from the selector 300 in a horizontal plane. The dog 256 is flexibly pivoted on carriage 165 so that it may be deflected by any of the spokes that may be in its path as the carriage is returning to its extreme left-hand position.

These spokes 301 are set spirally in a shaft 302, with equiangular spacing and equal longitudinal separation, so that the spacing of the spokes 301 is such that the carriage 165, when intercepted by any one of them, will cause a numerically corresponding record carrier 261 to be exactly aligned with the aforedescribed block 288. Thus the selector 300, by causing the appropriate spokes 301 to come into the carriage intercepting position, causes the appropriate record to be elevated by the carriage 145 to the correct position preparatory to being carried to the turntable.

I have now described as much of the phonograph mechanism as is necessary to a clear understanding of the action of my novel multi-selector mechanism. Having described the manner in which a record is elevated to the playing position by the action of a spoke 301 of the multi-selector 300 on carriage 165, and having described the source of the motive power required to operate said selector, I shall not describe the operation of carrying a selected record to the turntable 102, nor the manner in which the tone arm 294 is caused to engage the record for playing, since these details are not necessary to an understanding of the present invention.

Figure 22:
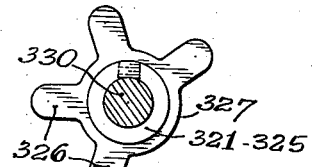
Fig. 22 is a profile view of one of the rosette cams 321—325.
Figure 23:
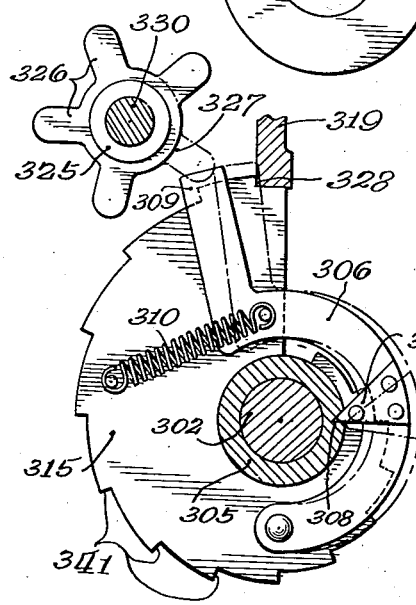
Fig. 23 is a profile view of one of the spiral cams 311—315.
Figure 24:
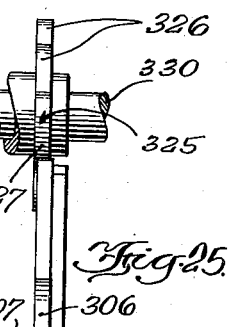
Fig. 24 is an elevation thereof as seen from the left, including a spoke and a portion of an end wall of the selector.
Figure 25:
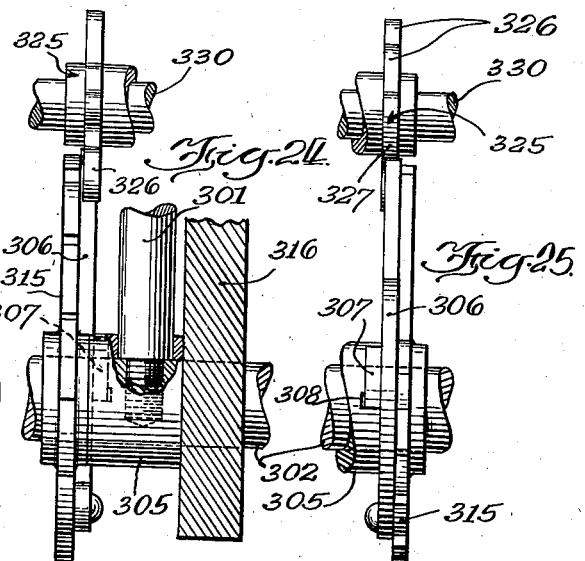
Fig. 25 is an elevation thereof as seen from the right.

Keyed to shaft 302 by the spokes which pass through them are notched bushings 305. Rotatably journaled upon shaft 302, and separated by bushings 305 are five spiral cams 311 to 315, provided, as in Fig. 23, with a curved spring-operated catch 306 under such tension that tooth 307 will be forced to engage notch 308 of bushing 305. Thus any rotation of shaft 302 will be positively communicated to the spiral cams, unless arm 309 be caused to move against the pull of spring 310, releasing tooth 307 from notch 308. This action is well shown by Fig. 23, wherein the normal engaged position is shown in full lines and the disengaged position in phantom lines. Arm 309 is engaged by the arms 326 of its respective rosette cam 325 when in the disengaged position shown in phantom. In the engaged position, arm 309 is adjacent the vacant space 327 of the irregular four-leaved rosette cam shown in Fig. 22. Shaft 302 is suitably supported at its extremes by the selector supporting frame members 14 and 15 and is protected against lateral movement by the collars 303 and 304. The shaft is further supported by the end plates 316 and 317 through which it passes. These end plates, together with the front plate 318 and supporting rib 319 are cast integral with the supporting frame members to form the selector housing.

The previously described spiral cams are restrained against counter-clockwise rotation beyond the normal position shown in Fig. 13 by the lower corner of rib 319 engaging the kerf 328 of the spiral cam 315. In this position the arm 309 may be displaced by the rosette cam, as previously described, causing the tooth 307 to be disengaged from its respective notch. By advancing the position of each of the five rosette cams one-fifth of one revolution over the position of the preceding one, the five spiral cams can be successively caused to be engaged by rotating bushings 305 once during each of five successive positions of the rosette cams during the course of one revolution. The aforementioned rosette cams are carried by the cam shaft 330, supported in bearings formed by the end plates 316 and 317. Journaled upon that end of shaft 330 extending through the wall 316 is a gear sector 414, of such angular measure as to engage the flanged pinion 415 during slightly more than one complete revolution thereof. Said pinion is loosely journaled upon spoke shaft 302. The pinion 415 is flexibly connected with said spoke shaft 302 by means of a torsion spring 416, whose ends are fastened respectively to the pinion and to the collar 303, in such manner that the spoke shaft will tend to follow the movements of the pinion unless constrained by other forces.

Keyed to shaft 330, and lying against sector 414 is a ratchet 417, bearing ten teeth, as shown in Fig. 15. Said ratchet is engaged by a pawl 418 carried by the sector 414, which sector during the course of one oscillation forced by the link 419 causes the pawl to advance the ratchet 417 two divisions or one-fifth of one revolution, thus causing successive spiral cams 311 to 315 to be connected to the spoke shaft 302 as previously described.

Returning now the flexible coupling or spring 416 between pinion 415 and shaft 302, it will be seen that with sector 414 in the position shown in Fig. 15, shaft 302 and the five spiral cams associated with it will be forced to assume the initial position shown in Fig. 13, in which the kerf 328 in the spiral cam 315 is restrained by the edge of rib 319. If now the sector 414 is caused by link 419 to move in a clockwise direction, that is, the link moving to the left of Fig. 15, shaft 302 in Fig. 13 will be caused to follow in a clockwise direction. Assuming the spiral cam 315 to be positively connected to shaft 302, that is, with its arm 309 unengaged by any of the arms 326 of rosette cam 325, said shaft will follow the rotation of pinion 415 until restrained by the engagement of one of the teeth 341 of spiral cam 315 with the tooth 342 of plunger 335 as shown by the phantom outlines. Pinion 415 is however enabled to complete a full revolution because its flexible connection to shaft 302 takes up the remainder of the motion by coiling spring 416. The torsion produced by this means serves to securely and accurately hold the engaged spiral cam against its respective plunger tooth 342.

According to the downward displacement of the plunger 335, different teeth of the respective spiral cam will be engaged thereby, thus causing the spoke that is to be associated therewith to come into a horizontal, carriage intercepting position. Thus in Fig. 13 plunger tooth 342 is in the phantom position corresponding to record number eleven and is intercepting the eleventh tooth 341 of spiral cam 315. Shown in phantom is the eleventh horizontal spoke 301, which when intercepting the carriage 165 causes the eleventh record to be played. In like manner any record can be selected by placing the respective plunger of an engaged spiral cam in an appropriate vertical position.

As mentioned previously, the rosette cams 321—325 are staggered in such manner that the spiral cams 311—315 are consecutively and successively driven by shaft 302, successively causing spokes 301 to be brought into carriage intercepting positions, according to the various downward displacements of the plungers. At each oscillation of link 419, just preceding the elevation of the turntable, the spoke corresponding to the record to be next played is brought into position, and thus is provided the means of playing a sequence of five or less records in the same sequence as the selections indicated by the consecutive plunger displacements. I will now describe the method of manually controlling the consecutive plunger positions.

Supported in bearings formed by two lugs 320 projecting from end plate 317 is a shaft 401 projecting through the front panel of the cabinet 13. Securely mounted thereon is the flanged frame 402 of dial 400. To this is screwed a lid-shaped cover 403 bearing openings 404 intended to expose the names of records printed on an annular paper ring 405 held between the opposing surfaces of frame 402 and cover 403. Rotating within the central opening in cover 403 is the dial face 406, securely fastened to dial shaft 401 between threaded washer 407 and finishing nut 408. Around the circumference of the dial face are grouped sixteen finger holes 409, equally spaced around an arc of 320 degrees, which are identified by the numerals one to fifteen and the word "Clear" printed on the dial frame under the corresponding holes. As shown in Fig. 1, a finger stop 410 is provided to limit the rotation that may be imparted to the dial.

Figure 12:
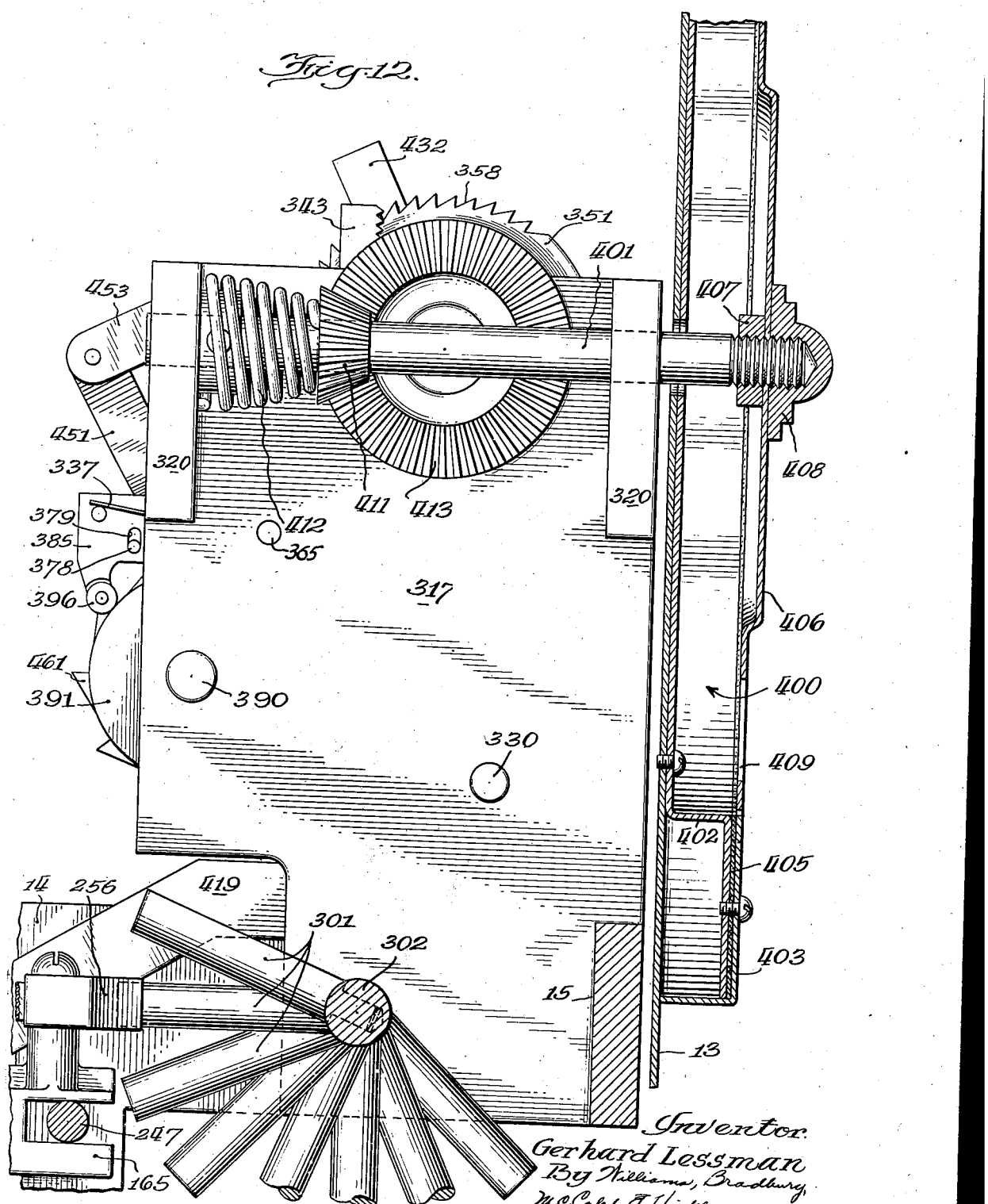
Fig. 12 is an end view of the selector mechanism looking along the lines 12—12 of Fig. 3.

Keyed to the dial shaft is a bevel pinion 411 urged to rotate in a counter-clockwise direction, as seen from the front, by a torsion spring 412. Said bevel pinion 411 actuates bevel gear 413 keyed to that end of shaft 350 projecting through end plate 317, as shown in Fig. 12. Rotation of the dial is limited in the counter-clockwise direction by the arm 431 of spider 430, which is keyed to shaft 350, striking the roller 454 at its extreme upward position. Rotation of the dial in the clockwise direction is limited by the arm 432 of spider 430 striking the arm 441 of spider 440.

Figures 18, 19:
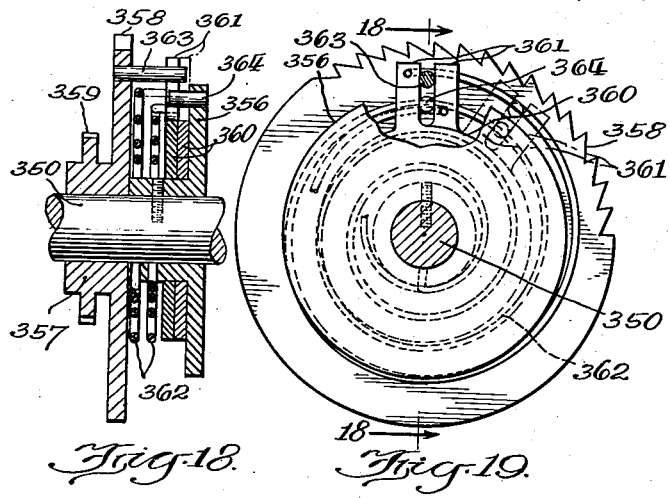
Fig. 18 is a section through one of the torsion couplers 351—355 taken along plane 18—18 of Fig. 19.
Fig. 19 is an elevation thereof.
Figure 21:
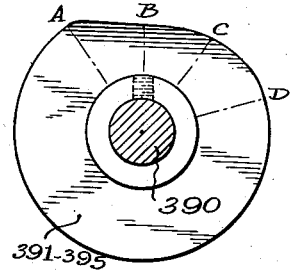
Fig. 21 is a profile view of one of the disc cams 391—395.
Figure 20:
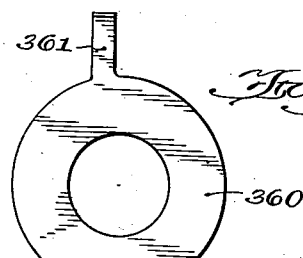
Fig. 20 is the plan view of one of the lugs 366 thereof.

The shaft 350 has mounted upon it five flexible couplers 351—355 so spaced as to cooperate in a manner to be described presently with the racks 343 formed upon the ends of plungers 331—335. Fig. 18 is a vertical section of one of the aforementioned flexible couplers. A flanged bushing 356 is keyed to the shaft 350, while freely rotating adjacent thereto is a sleeve 357 having two flanges bearing a ratchet segment 358 and an ordinary gear segment 359. These segments bear the same number of teeth as the number of records playable by the phonograph. Rotating upon the bushing 356 and lying snugly against the flange thereof are two lugs 360 each bearing a finger 361. These fingers are urged by two spiral springs 362, mounted in bushing 356 and fastened to said fingers, against the two pins 363 and 364, set respectively in the ratchet segment and in the flanged bushing. Said pins are accurately aligned between the opposing faces of fingers 361, thereby causing sleeve 357 to resiliently follow the movements of flanged bushing 356. Should rotation of said sleeve 357 be hindered by restraining the ratchet segment 358, then the resiliency of the spring 362 will enable the bushing 356 to complete its rotation. The aforedescribed five couplers 351—355 are aligned upon shaft 350 in such manner that pins 364 are normally in the top position shown in Fig. 19. In this position the plungers 331—335 with racks 343 engaged by gear segments 359 are at the top of their travel.

Pivoted to rotate around pins 365 set in the slots 366 of rib 319 are five single-toothed bell cranks 371 to 375. The teeth 376 of said bell cranks are adapted to bear against the teeth of corresponding adjacent ratchet segments 358 of the respective couplers in a manner depending on the force with which said toothed bell cranks are urged against said ratchet. This force is normally supplied by a relatively weak grasshopper spring 336 set in rib 319 acting against a suitable projection 377 of the bell crank. The tooth 376 acts therefore as a pawl allowing only unidirectional rotation of its associated ratchet 358.

As shown in Fig. 13 a pin 378 set in the horizontal arm of the bell crank 375 is projecting through an elongated slot 379 in a follower lever 385 pivoted coaxially with its associated bell crank 375. Said lever is urged by a strong grasshopper spring 337 and through the agency of a roller 396 against the associated disc cam 395, of which there are five specimens 391—395 keyed to shaft 390 at intervals of one-fifth revolution. The slot 379 is of such proportions that when roller 396 is in contact with cam 395 at position "C," Fig. 13, then the toothed bell crank 375 is free to act as a pawl of the ratchet segment of flexible coupler 355, because pin 378 is not restrained by the lower edge of slot 379. When roller 396 is in contact with cam 395 at the extreme lower position "B," the toothed bell crank 375 is entirely disengaged from its ratchet segment, as shown by the phantom position Fig. 13, by virtue of the pin 378 being forced downward by the upper edge of slot 377. When roller 396 is in contact with cam 395 at the extreme upper position "A," or at any point of the cam not between the points A—B—C, the tooth 376 of bell crank 375 is forced against its respective ratchet segment to securely lock the same against rotation in either direction, because of the pin 378 being urged upward and positively there held by the lower edge of slot 379, said slot being positively held in said upward position by virtue of the restraining action of the cam 395 on roller 396.

By virtue of the disc cams being consecutively displaced one-fifth of one revolution, for example, if cam 393 be in contact with its roller 396 at point "A," and the cam 392 makes contact with its roller 396 at point "C," and so forth, the operations of the bell cranks 373 and 372 will follow each other in such manner that when the ratchet of coupler 352 is free to rotate in one direction, the ratchet of coupler 353 is still securely locked, but when the ratchet of coupler 352 is next securely locked, then coupler 353 is entirely free to follow the rotation of shaft 350.

As mentioned previously, an arm 431 of spider 430 rotated by shaft 350 impels the roller 454, Fig. 15, upward as the shaft 350 is being turned by the dial 400, returning to the initial position under the influence of spring 412. The aforesaid roller 454 is pinned to the rocker arm 453 of the double ratchet mechanism 450. The two pawls 451—452 of said mechanism are actuated by said rocker arm 453 and are guided by a pivot pin 455 against which the sides of slots 456—457 are urged by springs 458 and 459. Said slots are of such length that pawls 451 and 452 give to ratchet wheel 463 an impulse of one-tenth of one revolution for each downward stroke of each pawl. Said slots 456 and 457 are of such shape that the pawls guided thereby clear the teeth of said ratchet at both the beginning and end of each stroke. Said slots are of such width that each pawl may avoid on its own up stroke the downward moving tooth of ratchet 463 propelled by the other pawl.

Ratchet 463 is securely tied to a similar but reversed ratchet 462 by means of pin 464. Said ratchet assembly is rotatably mounted upon that end of shaft 390 projecting through end plate 316 and ratchet 461. The ratchet 461 is firmly keyed to shaft 390 and transmits clockwise rotation thereto, as in Fig. 15, by virtue of the engagement of pawl 465 with the teeth of ratchet 462. Therefore, each actuation of the ratchet 463 by one of the pawls 451 and 452 turns shaft 390 and the disc cams 391—395 keyed thereto one-tenth of one revolution, or the equivalent of the distance from A to B or B to C on said cams.

The rocker arm 453 is urged to rotate counter-clockwise by the spring 466, which is of such strength as to actuate fully the double ratchet mechanism 450, but which will not overcome the leverage of arm 431. Now, because of the relatively small oscillation required of rocker arm 453, lever 431 will rotate sufficiently to actuate the double ratchet mechanism 450 to the extent of one stroke even though dial 400 be turned only far enough to select record number one. Likewise, when the dial is allowed to return to its initial position under the influence of spring 412 said double ratchet mechanism is again fully actuated, thereby accomplishing the rotation of disc cams 391—395 one-fifth of one revolution, with the resulting actions on couplers 351—355 as previously described.

I have now fully described the construction of the mechanism required to preset plungers 331—335 to positions corresponding to the sequence of records dialed, and will outline the operations involved in selecting a sequence of five or less records. Assuming disc cam 391 to be at position "B," cams 392—395 will be in such a position that the ratchet segments of their respective flexible couplers 352—355 will be securely locked as previously described.

Coupler 351 being free to rotate, has drawn its respective plunger 331 to the extreme upper position corresponding to the initial position of the dial 400. If now the operator wishes record number seven to be played first, he inserts his finger into the seventh of the finger holes 409 and turns the dial face 406 until restrained by the finger stop 410. Simultaneously, the coupler 351 follows shaft 350 and moves plunger 331 to a position corresponding to record 7, and conjointly the cam shaft 390 is turned one-tenth of one revolution by the action of double ratchet mechanism 450. Said action advances cam 391 to position "C" and cam 392 to position "A," at which position the ratchet segment of coupler 351 is allowed to rotate in only one direction, as previously described. This direction is opposed to the direction of rotation of shaft 350 during the return of dial 400 to its initial position. Therefore, coupler 351 and plunger 331 will remain at the seventh record position while the dial 400 returns to zero. As the dial returns to zero, the arm 431 actuated thereby strikes roller 454 which is now at its lowermost position and carries said roller along with it, thus reactuating the double ratchet mechanism. As a result thereof, cam 391 is rotated to a position past point "C" which corresponds with the position "A" and during which the ratchet of coupler 351 is securely locked. This plunger 331 is securely held at record position seven during the subsequent selection of four more records. Simultaneously with the movement of cam 391, cam 392 was moved to position "B," thus repeating the cycle of operations described, and causing plunger 332 to be set and locked in a position corresponding to the record number next dialed. In like manner, all five plungers 331—335 can be successively set to positions representing a sequence of record selections. The plungers then cause the phonograph mechanism to produce the record sequence in the manner already outlined previously.

I shall now describe the operation of clearing the selector mechanism of a present sequence of renditions by dialing "Clear" on the last of the dial finger holes 409. The full extent of rotation of the dial is here brought into play, thereby causing arm 432 of spider 430 to be swung around until it contacts the upturned end of arm 441 of spider 440. Said spider contains a peripheral indentation 442 whose edge abuts on pin 443 set in a pawl 444, pivoted coaxially below spider 440, and which engages the large ratchet 461. As the arm 432 strikes arm 441, pawl 444 is disengaged from ratchet 461, and is kept disengaged by the spring 445 which has been thrown over its dead center. Motion of pawl 44 is limited by a pin 446 set in end plate 316. The ratchet 461, not being further restrained by its pawl 444, and being under the accumulated tension of torsion spring 398, returns to its next initial position along with the two ratchets 462 and 463 acting on pawl 465. As previously mentioned, the ratchets 462 and 463 carry a pin 464, which projects from the surface of ratchet 463 in order to be intercepted by arm 447 of spider 440. Said arm is properly shaped to clear the various ratchets over which it must pass. As the pin 464, under the influence of torsion spring 398 rotates counter-clockwise, it strikes arm 447, now in its uppermost position, and carries the same to its lowermost position, illustrated in Fig. 15. Arm 447, acting on pawl 444 through spring 448, carries the same into reengagement with ratchet 461, thereby tripping spring 445 over to the other side of its dead center. It is to be noted that the spring cannot be tripped over its dead center by the pawl 444 as it clears the teeth of ratchet 461. The ratchet assembly, and conjointly the shaft 390 and its associated disc cams 391—395, have now been returned to their next initial position, and are ready to engage in the preselection of a new record sequence. The method of causing the ratchets to come to a stop at such a position that the next first selection will be impressed on that plunger 331—335 which corresponds to that spiral cam 311—315 which is next to be engaged by spoke shaft 302, will now be described.

To the upturned eccentric corner of gear sector 414 is pinned a compensating pawl 420, of irregular shape to avoid the various objects in its path, with actuates the ratchet 462. A pin 421 set in end wall 316 and projecting past the lower edge of pawl 420 guides the pawl 420 when actuated by the gear segment 414 in such a fashion that the ratchet 462 is rotated counter-clockwise one fifth of one revolution, and disengaged at the end of the return stroke. It is necessary that the pawl be normally disengaged to prevent interference with the free rotation of the three ratchets 461—463. As each record is played by the machine, gear sector 414 makes one oscillation which results, as described, in one fifth counter-clockwise revolution of ratchets 462 and 463. Ratchet 461, and therefore shaft 390, are held against counter-clockwise rotation by pawl 444. The net result is that pin 464 is carried one-fifth of one revolution counter-clockwise until after five records have been played it has resumed its original position. Therefore, the position at which the disc cams come to rest after the ratchet 461 has been tripped and reset by the action of pin 464 on arm 447 is always such that that disc cam 391—395 is in control which corresponds to that spiral cam 311—315 next to be engaged by spoke shaft 302. For example, if initially cams 391 and 311 were in control, after three records had been played, cam 314 would be in control. If now ratchet 461 were released by dialing "Clear," the shaft 390 would return cam 391 to the initial "B" position, had not the compensating pawl 420 advanced cam 462 three divisions, so that pin 464 would reengage pawl 444 when cam 394 is in the initial "B" position. Thus, for the next sequence of selections cams 314 and 394 are in the conjoint position insuring that the next selection played will be the first record of the next sequence of selections.

If the full number of five selections are made by the operator, pin 464 has been returned to its initial position shown in Fig. 15 by reason of having completed one revolution. Arm 447 is however above the pin at this stage, rather than below it as shown in Fig. 15. When ratchet 461 now moves one-tenth of one revolution, as a result of dialing the first number of the next series of selections, pawl 444 is tripped, and the ratchet and cam shaft assembly, urged by spring 398, returns to the position shown in Fig. 15. The arm 447 is struck by pin 464, urged to rotate with the ratchet assembly, and returns to its original position, as limited by pin 443 acting on the lower edge of indentation 442.

Having now illustrated the construction and operation of the multi-selector mechanism, I shall describe its actuation by the phonograph proper. As previously mentioned, the gear sector 414 is actuated by the oscillating link 419. Said link is loosely pinned to crank 427, biased towards the selector 300 by spring 227 and pivoted on shaft 226 mounted on frame member 14. A rearwardly extending arm 224 rigidly mounted on said crank 427 bears a roller 223 which is adapted to ride on the periphery of the cam 96. The shape of cam 96 is such that link 419 is oscillated very quickly as the carriage 165 is being returned. Because of the fact that the machine does not return said carriage until the next record is played after it stops for want of coins deposited, no false selection will be made subsequently because of premature actuation of the selector by link 419. Cam 93 is actuated as illustrated in the description of the phonograph proper.

Having now described the construction and operation of the phonograph mechanism and the construction and operation of the multi-selector mechanism, together with the operative relationship between these two, I wish to emphasize that this preferred embodiment of my invention is in no wise intended to limit the scope of my invention as defined in the following claims.

For instance, the multi-selector claimed can be used with other automatic phonographs than that disclosed in the Wilcox application, or it may be used to preselect operating sequences on other mechanisms than phonographs.

Many changes and additions to the mechanism described can be made without departing from the spirit of the invention. For instance, a governor may be added to dial shaft 401 to regulate the speed of rotation back to the initial position, after the manner of the well-known telephone dial also, by increasing or decreasing the number of plungers and associated parts, the mechanism may be made to preselect more or less records than the illustrated embodiment.

Other modifications to the mechanism described may be undertaken without departing from the spirit of my invention.

Having thus described my invention, what I claim as new and useful and desire to secure by United States Letters Patent is:

1. In an automatic phonograph adapted to play a plurality of records successively and comprising a selector member movable through a plurality of positions and adapted to be arrested in any of said positions and to control in each of said positions the playing of a record corresponding to said position, a manually operable selector adapted to arrest said selector member in a successive number of positions selected in any desired order to effect the playing of records in that order, comprising a series of displaceable members, means for displacing said displaceable members one after the other to various degrees, a series of individual cam members each adapted to cooperate with one of said displaceable members and to be arrested thereby in a position determined by the displacement of the cooperating displaceable member, and means for operatively connecting each cam member in order with said selector member, whereby said selector member is arrested in successive operations at various positions depending upon the degree of displacement of said displaceable members to effect the playing of records corresponding to the degrees of displacement of the successive members of the series of displaceable members.

2. In an automatic phonograph adapted to play a plurality of records successively and comprising a selector member movable through a plurality of positions and adapted to be arrested in any of said positions and to control in each of said positions the playing of a record corresponding to said position, a manually operable selector adapted to arrest said selector member in a successive number of positions selected in any desired order to effect the playing of records in that order, comprising a series of displaceable members, a manually operable member adapted to displace all of said members to various degrees, means for maintaining all of said displaceable members except one against displacement by said manually operable means, and means for moving said retaining means step by step to render said displaceable means operable in desired order, a series of individual cam members each adapted to cooperate with one of said displaceable members and to be arrested thereby in a position determined by the displacement of the cooperating displaceable member, means for operatively connecting each of said cam members in order with said selector member, whereby said selector member is arrested in successive operations at various positions depending upon the degree of displacement of said displaceable members to effect the playing of records corresponding to the degrees of displacement of the successive members of the series of displaceable members.

3. In an automatic phonograph adapted to play a plurality of records successively and comprising a selector member movable through a plurality of positions and adapted to be arrested in any of said positions and to control in each of said positions the playing of a record corresponding to said position, a manually operable selector adapted to arrest said selector member in a successive number of positions selected in any desired order to effect the playing of records in that order, comprising a series of displaceable members, a manually operable member adapted to displace all of said members to various degrees, means for maintaining all of said displaceable members except one against displacement by said manually operable means, means for moving said retaining means step by step to render said displaceable means operable in desired order, a series of individual cam members each adapted to cooperate with one of said displaceable members and to be arrested thereby in a position determined by the displacement of the cooperating displaceable member, means normally and operatively connecting said cam members with said selector member, operable means for disconnecting all of said cam members from said selector member, with a single exception, means for moving last said operable means step by step to effect the connection of said cam members in order with said selector member, whereby said selector member is arrested in successive operations at various positions depending upon the degree of displacement of said displaceable members to effect the playing of records corresponding to the degrees of displacement of the successive members of the series of displaceable members.

4. In an automatic phonograph adapted to play a plurality of records successively and comprising a selector member movable through a plurality of positions and adapted to be arrested in any of said positions and to control in each of said positions the playing of a record corresponding to said position, a manually operable selector adapted to arrest said selector member in a successive number of positions selected in any desired order to effect the playing of records in that order, comprising a series of displaceable members, a dial displaceable to various degrees, means operatively connecting said dial to said displaceable members, means disconnecting said dial from said displaceable means with a single exception, means actuated by the dial for moving said disconnecting means step by step to connect the dial operatively to successive displaceable members to effect the displacement of said members to various degrees depending upon the displacements of said dial, a series of individual cam members each adapted to cooperate with one of said displaceable members and to be arrested thereby in a position determined by the displacement of the cooperating displaceable member, means for operatively connecting each of said cam members in order with said selector member, whereby said selector member is arrested in successive operations at various positions depending upon the degree of displacement of said displaceable members to effect the playing of records corresponding to the degrees of displacement of the successive members of the series of displaceable members.

5. In an automatic phonograph adapted to play a plurality of records successively and comprising a selector member movable through a plurality of positions and adapted to be arrested in any of said positions and to control in each of said positions the playing of a record corresponding to said position, a manually operable selector adapted to arrest said selector member in a successive number of positions selected in any desired order to effect the playing of records in that order, comprising a series of displaceable members, a dial displaceable to various degrees, means operatively connecting said dial to said displaceable members, means disconnecting said dial from said displaceable means with a single exception, means actuated by the dial for moving said disconnecting means step by step to connect the dial operatively to successive displaceable members to effect the displacement of said members to various degrees depending upon the displacements of said dial, a series of individual cam members each adapted to cooperate with one of said displaceable members and to be arrested thereby in a position determined by the displacement of the cooperating displaceable member, means for operatively connecting each of said cam members in order with said selector member, whereby said selector member is arrested in successive operations at various positions depending upon the degree of displacement of said displaceable members to effect the playing of records corresponding to the degrees of displacement of the successive members of the series of displaceable members, means normally and operatively connecting said cam members with said selector member, operable means for disconnecting all of said cam members from said selector member, with a single exception, means for moving last said operable means step by step to effect the connection of said cam members in order with said selector member, whereby said selector member is arrested in successive operations at various positions depending upon the degree of displacement of said displaceable members to effect the playing of records corresponding to the degrees of displacement of the successive members of the series of displaceable members.

6. In an automatic phonograph adapted to play a plurality of records successively and comprising a selector member movable through a plurality of positions and adapted to be arrested in any of said positions and to control in each of said positions the playing of a record corresponding to said position, a manually operable selector adapted to arrest said selector member in a successive number of positions selected in any desired order to effect the playing of records in that order, comprising a series of displaceable members, a manually operable member adapted to displace all of said members to various degrees, means for maintaining all of said displaceable members except one against displacement by said manually operable means, means for moving said retaining means step by step to render said displaceable means operable in desired order, a series of individual cam members each adapted to cooperate with one of said displaceable members and to be arrested thereby in a position determined by the displacement of the cooperating displaceable member, means for operatively connecting each of said cam members in order with said selector member, whereby said selector member is arrested in successive operations at various positions depending upon the degree of displacement of said displaceable members to effect the playing of records corresponding to the degrees of displacement of the successive members of the series of displaceable members, and manually operable means for controlling the return of all of said displaceable members to initial position.

7. In an automatic phonograph adapted to play a plurality of records successively and comprising a selector member movable through a plurality of positions and adapted to be arrested in any of said positions and to control in each of said positions the playing of a record corresponding to said position, a manually operable selector adapted to arrest said selector member in a successive number of positions selected in any desired order to effect the playing of records in that order, comprising a series of displaceable members, a dial displaceable to various degrees, means operatively connecting said dial to said displaceable members, means disconnecting said dial from said displaceable means with a single exception, means actuated by the dial for moving said disconnecting means step by step to connect the dial operatively to succcessive displaceable members to effect the displacement of said members to various degrees depending upon the displacements of said dial, a series of individual cam members each adapted to cooperate with one of said displaceable members and to be arrested thereby in a position determined by the displacement of the cooperating displaceable member, means for operatively connecting each of said cam members in order with said selector member, whereby said selector member is arrested in successive operations at various positions depending upon the degree of displacement of said displaceable members to effect the playing of records corresponding to the degrees of displacement of the successive members of the series of displaceable members, and means actuated by a displacement of said dial to control the return of all of said displaceable members to initial undisplaced position.

GERHARD LESSMAN.